(12) United States Patent
Liu et al.

(10) Patent No.: US 11,436,794 B2
(45) Date of Patent: Sep. 6, 2022

(54) IMAGE PROCESSING METHOD, APPARATUS AND DEVICE

(71) Applicants: BEIJING JINGDONG SHANGKE INFORMATION TECHNOLOGY CO., LTD., Beijing (CN); BEIJING JINGDONG CENTURY TRADING CO., LTD., Beijing (CN)

(72) Inventors: Xiangjun Liu, Beijing (CN); Gang Zhao, Beijing (CN); Chao Yang, Beijing (CN)

(73) Assignee: BEIJING JINGDONG SHANGKE INFORMATION TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/217,824

(22) Filed: Mar. 30, 2021

(65) Prior Publication Data

US 2021/0217227 A1    Jul. 15, 2021

Related U.S. Application Data

(63) Continuation of application No. PCT/CN2019/101699, filed on Aug. 21, 2019.

(30) Foreign Application Priority Data

Sep. 30, 2018    (CN) .......................... 201811161284.7

(51) Int. Cl.
*G06T 15/50*    (2011.01)
*G06T 15/00*    (2011.01)
*G06T 15/04*    (2011.01)

(52) U.S. Cl.
CPC .......... *G06T 15/506* (2013.01); *G06T 15/005* (2013.01); *G06T 15/04* (2013.01)

(58) Field of Classification Search
None
See application file for complete search history.

(56) References Cited

U.S. PATENT DOCUMENTS 8,269,772 B1 *    9/2012    Smits ...................... G06T 13/80
                                                       345/589
2014/0333654 A1    11/2014    Li

FOREIGN PATENT DOCUMENTS

CN    106569763 A    4/2017
CN    107330962 A    11/2017
CN    108109194 A    6/2018

OTHER PUBLICATIONS

Robert L. Cook, Kenneth E. Torrance, "A Reflectance Model for Computer Graphics", Aug. 1981, ACM, ACM Siggraph Computer Graphics, vol. 15, Issue 3, pp. 307-316.*

(Continued)

*Primary Examiner* — Robert Bader
(74) *Attorney, Agent, or Firm* — J.C. Patents

(57) ABSTRACT

Embodiments of the present disclosure provide an image processing method, apparatus, and device. The method includes: obtaining a scene image in a scene to be displayed; obtaining a three-channel color value and a metallicity coefficient of each pixel point in the scene image; and performing diffuse reflection processing on the scene image according to the three-channel color value and the metallicity coefficient of each pixel point. The method in the embodiments of the present disclosure improves the authenticity of the scene to be displayed, which is more realistic and natural.

14 Claims, 3 Drawing Sheets

(56) References Cited

OTHER PUBLICATIONS

Brian Karis, "Real Shading in Unreal Engine 4", 2013, ACM, Siggraph Proceedings.*
Sebastien Lagarde, Charles de Rousiers, "Moving Frostbite to Physically Based Rendering 3.0", 2014, ACM, ACM Siggraph 2014 Course: Physically Based Shading in Theory and Practice.*
Paul S. Strauss, "A Realistic Lighting Model for Computer Animators", Nov. 1990, IEEE, IEEE Computer Graphics and Applications, vol. 10, Issue 6, pp. 56-64.*
Brent Burley, "Physically-Based Shading at Disney", 2012, ACM, Siggraph 2012 Course Notes for "Practical Physically Based Shading in Film and Game Production".*
International Search Report.

* cited by examiner

IMAGE PROCESSING METHOD, APPARATUS AND DEVICE

CROSS-REFERENCE TO RELATED APPLICATION

This application is a continuation of International Application No. PCT/CN2019/101699, filed on Aug. 21, 2019, which claims priority to Chinese Patent Application No. 201811161284.7, filed on Sep. 30, 2018, the disclosures of which are hereby incorporated by reference in their entireties.

TECHNICAL FIELD

Embodiments of the present disclosure relate to the technical field of computer graphics, and in particular to an image processing method, apparatus, and device.

BACKGROUND

By real-time rendering of a virtual scene, a lighting effect presented by objects in the real environment is simulated, so that the scene is close to the real situation and the user experience may be improved. Rendering of images has been widely used, for example, it has been widely used in various film and television productions and game productions.

Currently, in mobile terminals, traditional lighting models based on an empirical model are usually used to render scene images. For example, Blin-Phong is used to simulate the material texture of an object, and Blin-Phong's description on irradiation is more based on the empirical model, which is a simulation of the irradiation on an object, and does not conform to the light running situation of the object itself. Using the Blin-Phong model to render the scene image cannot effectively simulate the real scene, which has a poor authenticity and is not realistic enough. Therefore, the rendering of scene images in existing mobile terminals cannot meet the requirements of users.

SUMMARY

The embodiments of the present disclosure provide an image processing method, apparatus, and device to solve the problem that the rendering of a scene image in the existing mobile terminal has a poor authenticity, is not realistic enough and cannot meet the requirements of users.

In the first aspect, an embodiment of the present disclosure provides an image processing method, including:
obtaining a scene image in a scene to be displayed;
obtaining a three-channel color value and a metallicity coefficient of each pixel point in the scene image; and
performing diffuse reflection processing on the scene image according to the three-channel color value and the metallicity coefficient of each pixel point.

In a possible implementation, the method further includes:
obtaining a three-channel color value of incident light in the scene to be displayed and a roughness coefficient of each pixel point in the scene image; and
performing highlight processing on the scene image after the diffuse reflection processing according to the three-channel color value of the incident light together with the metallicity coefficient and the roughness coefficient of each pixel point.

In a possible implementation, the method further includes:
obtaining a three-channel color value of ambient light in the scene to be displayed; and
performing ambient light irradiation processing on the scene image after the diffuse reflection processing according to the three-channel color value of the ambient light.

In a possible implementation, the method further includes:
obtaining a reflection direction of line-of-sight of the scene to be displayed around a normal of the scene to be displayed; and
performing ambient reflected light processing on the scene image after the diffuse reflection processing according to the reflection direction and an ambient map.

In a possible implementation, the performing diffuse reflection processing on the scene image according to the three-channel color value and the metallicity coefficient of each pixel point, includes:
performing diffuse reflection processing on each pixel point according to the three-channel color value and the metallicity coefficient of each pixel point together with a normal direction and an incident light direction of the scene to be displayed.

In a possible implementation, the performing diffuse reflection processing on each pixel point according to the three-channel color value and the metallicity coefficient of each pixel point together with a normal direction and an incident light direction of the scene to be displayed, includes:
for each pixel point, performing diffuse reflection processing on the pixel point according to the following formula:

$$I_{diff}=(N \cdot L)*(1.0-M)*T_{RGB}$$

where N represents a normal direction vector of the scene to be displayed, L represents an incident light direction vector of the scene to be displayed, N·L represents an inner product of N and L, M represents the metallicity coefficient of the pixel point, $0 \leq M \leq 1$, $T_{RGB}$ represents the three-channel color value of the pixel point, $I_{diff}$ represents a three-channel color value of the pixel point after the diffuse reflection processing.

In a possible implementation, the performing highlight processing on the scene image after the diffuse reflection processing according to the three-channel color value of the incident light together with the metallicity coefficient and the roughness coefficient of each pixel point, includes:
obtaining a micro-surface orientation distribution of each pixel point according to the roughness coefficient of each pixel point together with a normal direction, an incident light direction and a line-of-sight direction of the scene to be displayed;
obtaining a Fresnel reflection value of each pixel point according to the metallicity coefficient of each pixel point together with the normal direction and the line-of-sight direction of the scene to be displayed;
obtaining a shielding value of each pixel point according to the roughness coefficient of each pixel point together with the normal direction, the incident light direction and the line-of-sight direction of the scene to be displayed; and
performing highlight processing on each pixel point according to the three-channel color value of the incident light together with the micro-surface orientation distribution, the Fresnel reflection value and the shielding value of each pixel point.

In a possible implementation, he performing highlight processing on each pixel point according to the three-channel color value of the incident light together with the micro-surface orientation distribution, the Fresnel reflection value and the shielding value of each pixel point, includes:

for each pixel point, performing highlight processing on the pixel point according to the following formula:

$$I_{spec} = \{D*F*G/[4(N \cdot L)(N \cdot V)]\}*T_L$$

where, D represents the micro-surface orientation distribution of the pixel point, F represents the Fresnel reflection value of the pixel point, G represents the shielding value of the pixel point, N represents a normal direction vector of the scene to be displayed, L represents an incident light direction vector of the scene to be displayed, V represents a line-of-sight direction vector of the scene to be displayed, N·L represents an inner product of N and L, N·V represents an inner product of N and V, $T_L$ represents a three-channel color value of the incident light, $I_{spec}$ represents a color value of the pixel after the highlight processing.

In a possible implementation, the obtaining a micro-surface orientation distribution of each pixel point according to the roughness coefficient of each pixel point together with a normal direction, an incident light direction and a line-of-sight direction of the scene to be displayed, includes: for each pixel point, obtaining the micro-surface distribution of the pixel point according to the following formula:

$$D = R^4/\{[(N \cdot H)^2*(R^4-1)+1]^2*\pi\};$$

the obtaining a Fresnel reflection value of each pixel point according to the metallicity coefficient of each pixel point together with the normal direction and the line-of-sight direction of the scene to be displayed, includes: for each pixel point, obtaining the Fresnel reflection value of the pixel point according to the following formula:

$$F = M + (1-M)*2^{[-5.5*(N \cdot V) - 6.9]*(N \cdot V)}; \text{ and}$$

the obtaining a shielding value of each pixel point according to the roughness coefficient of each pixel point together with the normal direction, the incident light direction and the line-of-sight direction of the scene to be displayed, includes: for each pixel point, obtaining the shielding value of the pixel point according to the following formula:

$$G = 0.5/\max(g_v + g_l, 10^{-6});$$

$$g_v = (N \cdot L) * \sqrt[2]{(R^4 + (1-R^4)*(N \cdot V)^2)};$$

$$g_l = (N \cdot V) * \sqrt[2]{(R^4 + (1-R^4)*(N \cdot L)^2)};$$

where D represents the micro-surface orientation distribution of the pixel point, F represents the Fresnel reflection value of the pixel point, G represents the shielding value of the pixel point, N represents a normal direction vector of the scene to be displayed, L represents an incident light direction vector of the scene to be displayed, V represents a line-of-sight direction vector of the scene to be displayed, M represents the metallicity coefficient of the pixel point, 0≤M≤1, R represents the roughness coefficient of the pixel point, 0≤R≤1, $g_v$ represents a shielding value of reflected light, $g_l$ represents a shielding value of the incident light, H represents a half-angle vector, H=(L+V)/2.

In a possible implementation, performing ambient light irradiation processing on the scene image after the diffuse reflection processing according to the three-channel color value of the ambient light, includes:

for each pixel point, performing ambient light irradiation processing on the pixel point according to the following formula:

$$I_{amb} = C_{amb} * I_{diff}/\pi$$

where, $C_{amb}$ represents the three-channel color value of the ambient light, $I_{diff}$ represents a three-channel color value of the pixel point after the diffuse reflection processing, $I_{amb}$ represents a three-channel color value of the pixel point after the ambient light irradiation processing.

In a second aspect, an embodiment of the present disclosure provides an image processing apparatus, including:

an obtaining module, configured to obtain a scene image in a scene to be displayed;

an analyzing module, configured to obtain a three-channel color value and a metallicity coefficient of each pixel point in the scene image; and a processing module, configured to perform diffuse reflection processing on the scene image according to the three-channel color value and the metallicity coefficient of each pixel point.

In the third aspect, an embodiment of the present disclosure provides an electronic device, including:

at least one processor and a memory;

where the memory stores computer-executable instructions; and the at least one processor executes the computer-executable instructions stored in the memory to cause the at least one processor to execute the image processing method according to any one of the first aspects.

In a fourth aspect, an embodiment of the present disclosure provides a computer-readable storage medium stored with computer-executable instructions, where the computer-executable instructions, when executed by a processor, is used to implement the image processing method according to any one of the first aspects.

The image processing method, apparatus, and device provided by the embodiments of the present disclosure, by obtaining a scene image in a scene to be displayed, obtaining a three-channel color value and a metallicity coefficient of each pixel point in the scene image, and performing diffuse reflection processing on the scene image according to the three-channel color value and the metallicity coefficient of each pixel point, improve the authenticity of the scene to be displayed, so that the scene to be displayed is more realistic and natural, thereby improving the user experience.

BRIEF DESCRIPTION OF DRAWINGS

The accompanying drawings herein are incorporated into the specification and constitute a part of the specification, illustrate embodiments in accordance with the present disclosure, and are used to explain the principle of the present disclosure together with the specification.

The specific embodiments of the present disclosure have been shown through the above drawings, which will be described in more detail below. These accompanying drawings and written descriptions are not intended to limit the scope of the concept of the present disclosure in any way, but to explain the concept of the present disclosure to persons skilled in the art by referring to specific embodiments.

DESCRIPTION OF EMBODIMENTS

Exemplary embodiments will be described in detail herein, examples of which are shown in the accompanying drawings. When the following description refers to the accompanying drawings, unless otherwise indicated, the same numbers in different drawings represent the same or similar elements. The implementations described in the following exemplary embodiments do not represent all implementations consistent with the present disclosure. Rather, they are merely examples of apparatuses and methods consistent with some aspects of the present disclosure as detailed in the appended claims.

The terms "including" and "having" in the specification and claims of the present disclosure and any variations thereof are intended to cover non-exclusive inclusion. For example, a process, a method, a system, a product, or a device including a series of steps or units is not limited to the listed steps or units, but includes unlisted steps or units, or also includes other steps or units inherent for these processes, methods, products or devices.

The "first" and "second" in the present disclosure only play the role of identification, but cannot be understood as indicating or implying the order relationship, relative importance, or implicitly indicating the number of the indicated technical features. "Multiple" means two or more. "And/or", which describes relationship of associated objects, represents that three relationships may exist, for example, A and/or B may express the following three cases: the presence of A only, the presence of A and B, and the presence of B only. The character "I" generally represents that the contextual objects are in an "or" relationship.

The expression "one embodiment" or "an embodiment" mentioned throughout the specification of the present disclosure means that a specific feature, structure, or characteristic related to embodiments is included in at least one embodiment of the present application. Therefore, the expression "in one embodiment" or "in an embodiment" appeared throughout the specification does not necessarily refer to the same embodiment. It should be noted that the embodiments of the present disclosure and the features in the embodiments can be combined with each other if there is no conflict.

Figure 1:
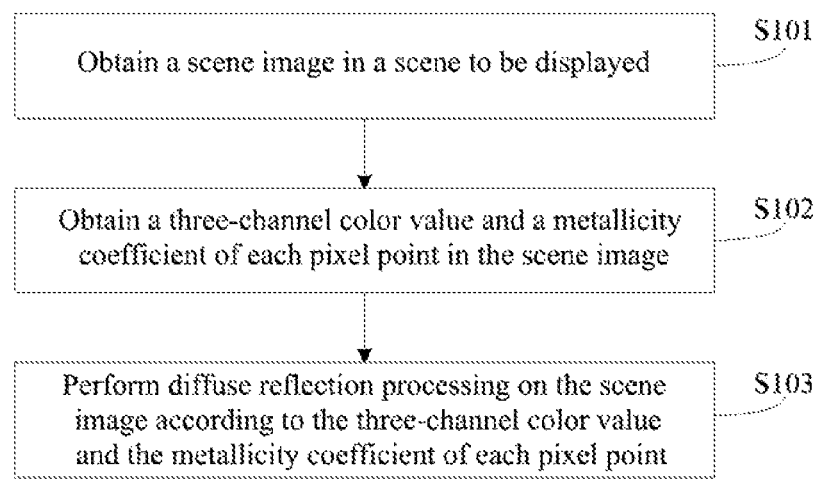
FIG. 1 is a flowchart of an embodiment of an image processing method provided by the present disclosure.

FIG. 1 is a flowchart of an embodiment of an image processing method provided by the present disclosure. As shown in FIG. 1, the method of the embodiment may include:

S101: obtain a scene image in a scene to be displayed.

The scene to be displayed in the embodiment may be understood as a scene to be displayed in a game application or a movie and TV drama, that is, a scene that needs to be rendered.

The scene image obtained in the embodiment may be two-dimensional image information of the scene to be displayed, or may be three-dimensional image information of the scene to be displayed, which is not limited in the embodiment.

S102: obtain a three-channel color value and a metallicity coefficient of each pixel point in the scene image.

In the embodiment, the three-channel color value of each pixel point is determined according to the information contained in the obtained scene image, where the three-channel color value may be a color value of RGB three channels. In an embodiment, the three-channel color value of each pixel point can be determined according to a model map.

The metallicity coefficient in the embodiment may reflect a material of the object to be rendered. A value range of the metallicity coefficient is greater than or equal to 0 and less than or equal to 1. The greater the value of the metallicity coefficient is, the higher an absorption rate for visible light is, and the smaller the value of the metallicity coefficient is, the lower the absorption rate for visible light is.

S103: perform diffuse reflection processing on the scene image according to the three-channel color value and the metallicity coefficient of each pixel point.

Diffuse reflection phenomena produced by different materials are different. Diffuse reflection depends on a combination of materials on both sides of a junction. Metal has a high absorption coefficient for visible light, and all refracted light can be quickly absorbed. For non-metal, when refracted light enters the material, the light will continue a normal interaction flow between light and material on the sub-material inside. In most cases, the light is scattered sufficiently in the material to be reflected from inside.

A metallicity coefficient can measure a metallicity of a material. For example, when the metallicity coefficient takes a value of 1, it can indicate that the material is a metal, and when the metallicity coefficient takes a value of 0, it can indicate that the material is a non-metal.

In the embodiment, when performing diffuse reflection processing on the scene image, the influence of the material on the diffuse reflection is fully considered, which conforms to the running situation of light in the real environment, and makes the processed scene image closer to the real scene.

The image processing method provided by the embodiment, by obtaining a scene image in a scene to be displayed, obtaining a three-channel color value and a metallicity coefficient of each pixel point in the scene image, and performing diffuse reflection processing on the scene image according to the three-channel color value and the metallicity coefficient of each pixel point, improve the authenticity of the scene to be displayed, so that the scene to be displayed is more realistic and natural, thereby improving the user experience.

On the basis of the above embodiment, in order to further improve the rendering effect of the scene image, the method may further include:

obtaining a three-channel color value of incident light in the scene to be displayed and a roughness coefficient of each pixel point in the scene image.

The three-channel color value of the incident light in the embodiment can be determined according to a light source in the scene to be displayed, and the RGB three-channel color value can be used for measurement.

The roughness coefficient in the embodiment can be used to measure a smoothness degree of a surface of the object. A value range of the roughness coefficient is greater than or equal to 0 and less than or equal to 1. The greater the value of the roughness coefficient is, the rougher the surface of the object is.

Perform highlight processing on the scene image after the diffuse reflection processing according to the three-channel color value of the incident light together with the metallicity coefficient and the roughness coefficient of each pixel point.

It can be understood that any plane can be depicted by using a tiny mirror surface of a micro-plane on a microscale. When the roughness degree of the plane is different, an orientation arrangement of the tiny mirror surfaces is not consistent. The generated effect is that the coarser a plane is, the more disordered the arrangement of the micro-plane on the plane is. The influence of the disordered orientation arrangement of the tiny mirror surface is that the incident light tends to diverge in completely different directions, resulting mirror reflection with a wider distribution range. On the contrary, for a smooth plane, light generally tends to reflect in the same direction, resulting in smaller and sharper reflection.

Each micro-surface is absolutely smooth. The absolutely smooth surface only divides the light into reflected light and refracted light, and the direction of these two lights depends on a normal of the micro-surface. Among thousands of micro-surfaces, only those micro-surfaces whose reflected light exactly coincides with the line-of-sight need to be included in the calculation.

In the embodiment, when performing highlight processing on the scene image, not only the influence of material but also the influence of roughness are fully considered, which is more conforms to the running situation of light in the real environment, and makes the processed scene image closer to the real scene.

On the basis of the above embodiment, in order to further improve the rendering effect of the scene image, the method may further include:

obtain a three-channel color value of ambient light in the scene to be displayed.

The three-channel color value of the ambient light in the embodiment can be measured by using RGB three-channel color value of the ambient light. In the embodiment, the ambient light is used to reflect the overall ambient light irradiation in the scene to be displayed. In an embodiment, the ambient light may be expressed by using constant light intensity representing all directions.

Perform ambient light irradiation processing on the scene image after the diffuse reflection processing according to the three-channel color value of the ambient light.

In the embodiment, when processing the scene image, the influence of ambient light irradiation on the scene image is fully considered, which can make the processed scene image closer to the real scene.

On the basis of the above embodiment, in order to further improve the rendering effect of the scene image, the method may further include:

obtain a reflection direction of line-of-sight of the scene to be displayed around a normal of the scene to be displayed; and perform ambient reflected light processing on the scene image after the diffuse reflection processing according to the reflection direction and an ambient map.

In the embodiment, the processing on ambient reflected light is realized through the ambient map. The ambient map can represent a distant light source. If sampling is preformed at a suitable position, such as in a center of the object, the ambient map can properly represent light reflected from a distant object. The ambient map in the embodiment may be a hexahedral ambient map, for example, it can be realized by using a sky box.

In an embodiment, a color value at a position where the reflection direction of the line-of-sight of the scene to be displayed around the normal of the scene to be displayed is mapped in the ambient map can be taken as a color value of the pixel point after ambient emission processing.

When processing the scene image in the embodiment, the influence of the ambient reflected light on the scene image is fully considered, which can provide an effective smooth reflection effect for various places in the scene to be displayed, and can make the processed scene image closer Real scene.

In some embodiments, an implementation of the perform diffuse reflection processing on the scene image according to the three-channel color value and the metallicity coefficient of each pixel point may be:

performing diffuse reflection processing on each pixel point according to the three-channel color value and the metallicity coefficient of each pixel point together with a normal direction and an incident light direction of the scene to be displayed.

In some embodiments, an implementation of the perform diffuse reflection processing on each pixel point according to the three-channel color value and the metallicity coefficient of each pixel point together with a normal direction and an incident light direction of the scene to be displayed may be:

for each pixel point, perform diffuse reflection processing on the pixel point according to the following formula:

$$I_{diff}=(N \cdot L)*(1.0-M)*T_{RGB}$$

where N represents a normal direction vector of the scene to be displayed, L represents an incident light direction vector of the scene to be displayed, N·L represents an inner product of N and L, M represents the metallicity coefficient of the pixel point, $0 \le M \le 1$, $T_{RGB}$ represents the three-channel color value of the pixel point, $I_{diff}$ represents a three-channel color value of the pixel point after the diffuse reflection processing.

In an embodiment, $T_{RGB}$ can use the RGB three-channel color value of the pixel point in the model map. The color value in the embodiment is expressed in a normalized manner, that is, a value range of the color value of each channel is greater than or equal to 0 and less than or equal to 1. N·L is a measure of an included angle between the normal direction vector and the incident light direction vector. The closer the incident light direction is to the normal direction and the smaller the value of the metallicity coefficient is, the darker the image after diffuse reflection processing is; on the contrary, the more the incident light direction deviates from the normal direction and the larger the value of the metallicity coefficient is, the brighter the image after diffuse reflection processing is.

In some embodiments, an implementation of the perform highlight processing on the scene image after the diffuse reflection processing according to the three-channel color value of the incident light together with the metallicity coefficient and the roughness coefficient of each pixel point may be:

obtain a micro-surface orientation distribution of each pixel point according to the roughness coefficient of each pixel point together with a normal direction, an incident light direction and a line-of-sight direction of the scene to be displayed;

obtain a Fresnel reflection value of each pixel point according to the metallicity coefficient of each pixel point together with the normal direction and the line-of-sight direction of the scene to be displayed;

obtain a shielding value of each pixel point according to the roughness coefficient of each pixel point together with the normal direction, the incident light direction and the line-of-sight direction of the scene to be displayed; and perform highlight processing on each pixel point according to the three-channel color value of the incident light together with the micro-surface orientation distribution, the Fresnel reflection value and the shielding value of each pixel point.

In some embodiments, an implementation of the perform highlight processing on each pixel point according to the three-channel color value of the incident light together with the micro-surface orientation distribution, the Fresnel reflection value and the shielding value of each pixel point may be:

for each pixel point, perform highlight processing on the pixel point according to the following formula:

$$I_{spec} = \{D * F * G / [4(N \cdot L)(N \cdot V)]\} * T_L$$

where D represents the micro-surface orientation distribution of the pixel point, F represents the Fresnel reflection value of the pixel point, G represents the shielding value of the pixel point, N represents a normal direction vector of the scene to be displayed, L represents an incident light direction vector of the scene to be displayed, V represents a line-of-sight direction vector of the scene to be displayed, N·L represents an inner product of N and L, N·V represents an inner product of N and V, $T_L$ represents a three-channel color value of the incident light, $I_{spec}$ represents a color value of the pixel after the highlight processing.

In some embodiments, an implementation of the obtain a micro-surface orientation distribution of each pixel point according to the roughness coefficient of each pixel point together with a normal direction, an incident light direction and a line-of-sight direction of the scene to be displayed may be:

for each pixel point, obtain the micro-surface orientation distribution of the pixel point according to the following formula:

$$D = R^4 / \{[(N \cdot H)^2 * (R^4 - 1) + 1]^2 * \pi\};$$

an implementation of the obtain a Fresnel reflection value of each pixel point according to the metallicity coefficient of each pixel point together with the normal direction and the line-of-sight direction of the scene to be displayed may be:

for each pixel, obtain the Fresnel reflection value of the pixel point according to the following formula:

$$F = M + (1-M) * 2^{[-5.5 * (N \cdot V) - 6.9] * (N \cdot V)};$$

an implementation of the obtain a shielding value of each pixel point according to the roughness coefficient of each pixel point together with the normal direction, the incident light direction and the line-of-sight direction of the scene to be displayed may be:

for each pixel, obtain the shielding value of the pixel point according to the following formula:

$$G = 0.5 / \max(g_v + g_l, 10^{-6});$$

$$g_v = (N \cdot L) * \sqrt[2]{(R^4 + (1 - R^4) * (N \cdot V)^2)};$$

$$g_l = (N \cdot V) * \sqrt[2]{(R^4 + (1 - R^4) * (N \cdot L)^2)};$$

where D represents the micro-surface orientation distribution of the pixel point, F represents the Fresnel reflection value of the pixel point, G represents the shielding value of the pixel point, N represents a normal direction vector of the scene to be displayed, L represents an incident light direction vector of the scene to be displayed, V represents a line-of-sight direction vector of the scene to be displayed, M represents the metallicity coefficient of the pixel point, $0 \leq M \leq 1$, R represents the roughness coefficient of the pixel point, $0 \leq R \leq 1$, $g_v$ represents a shielding value of reflected light, $g_l$ represents a shielding value of the incident light, H represents a half-angle vector, $H = (L+V)/2$.

In some embodiments, an implementation of the perform ambient light irradiation processing on the scene image after the diffuse reflection processing according to the three-channel color value of the ambient light may be:

for each pixel point, perform ambient light irradiation processing on the pixel point according to the following formula:

$$I_{amb} = C_{amb} \cdot * I_{diff} / \pi;$$

where $C_{amb}$ represents the three-channel color value of the ambient light, $I_{diff}$ represents a three-channel color value of the pixel point after the diffuse reflection processing, $I_{amb}$ represents a three-channel color value of the pixel point after the ambient light irradiation processing.

In some embodiments, an implementation of the perform ambient reflected light processing on the scene image after the diffuse reflection processing according to the reflection direction and an ambient map may be:

for each pixel point, performing ambient reflected light processing on the pixel point according to the following formula:

$$I_{env} = \text{texCube}(\text{envTex}, V_{nr});$$

where envTex represents the ambient map, $V_{nr}$ represents a reflection direction vector of the line-of-sight around the normal, texCube represents that performing sampling on the ambient map according to the reflection direction to realize the ambient reflected light processing. $I_{env}$ represents a three-channel color value of the pixel point after the ambient reflected light processing.

Ambient reflection generally can be completed through ambient map. The ambient map can represent a distant light source. If sampling is performed at a suitable position, such as in a center of the object, the ambient map properly represents light reflected from a distant object.

In an embodiment, a final display result of the scene image in the scene to be displayed can be determined according to the following formula:

$$I_{final} = I_{diff} + I_{spec} + I_{env} + I_{amb};$$

where $I_{final}$ is configured to represent a final color value of the scene image. The meaning and calculation of $I_{diff}$, $I_{spec}$, $I_{env}$ and $I_{amb}$ can refer to the above embodiment, which will not be repeated here.

The image processing method provided by the embodiment, based on the metallicity coefficient and the roughness coefficient, performs diffuse reflection processing, highlight processing, ambient light irradiation processing and ambient reflected light processing on the scene image, respectively, and fully considers material and surface roughness when rendering the scene image, which not only improves the authenticity of the scene to be displayed, makes the scene to be displayed more realistic and natural, but also has less computation in the whole processing process and low requirements for hardware processing performance of the device, so that it can run smoothly even in mobile terminals with limited hardware performance, thereby greatly improving the user experience.

Figure 2:
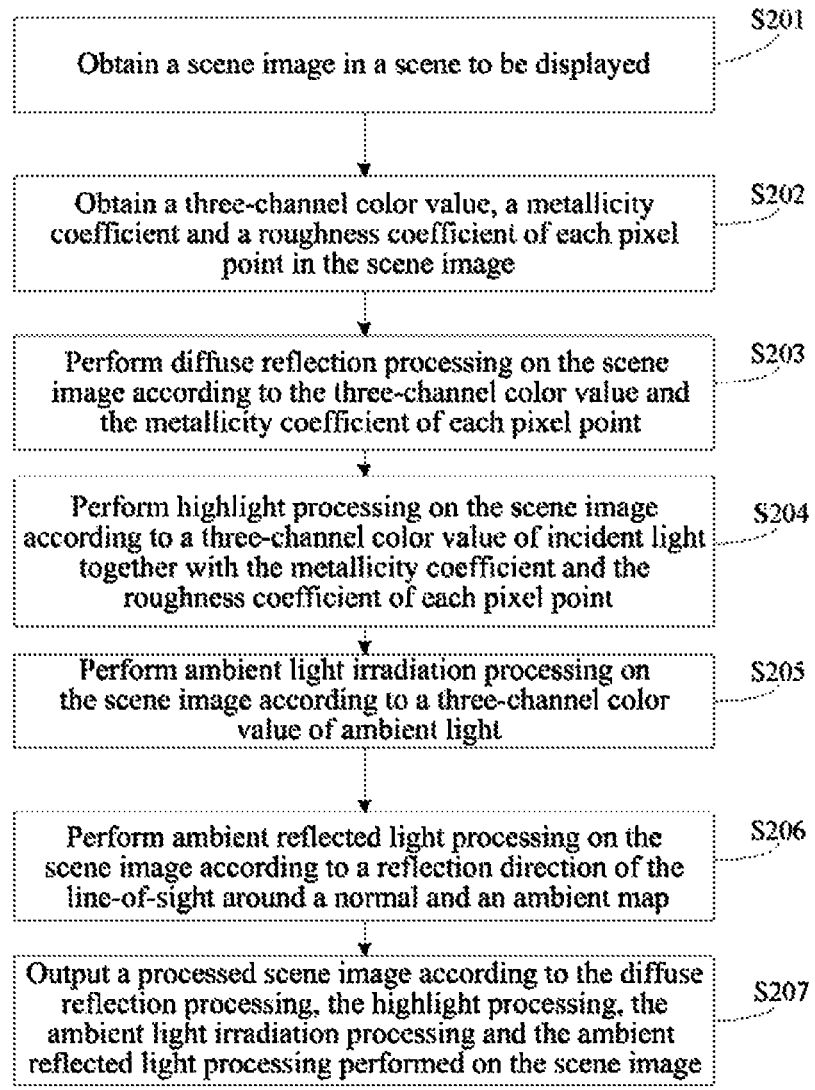
FIG. 2 is a flowchart of another embodiment of the image processing method provided by the present disclosure.

On the basis of the above embodiment, the embodiment combines the above embodiments. FIG. 2 is a flowchart of another embodiment of an image processing method provided by the present disclosure. As shown in FIG. 2, the method provided in the embodiment may include:

S201: obtain a scene image in a scene to be displayed;

S202: obtain a three-channel color value, a metallicity coefficient and a roughness coefficient of each pixel point in the scene image;

S203: perform diffuse reflection processing on the scene image according to the three-channel color value and the metallicity coefficient of each pixel point;

S204: perform highlight processing on the scene image according to a three-channel color value of incident light together with the metallicity coefficient and the roughness coefficient of each pixel point;

S205: perform ambient light irradiation processing on the scene image according to a three-channel color value of ambient light;

S206: perform ambient reflected light processing on the scene image according to a reflection direction of the line-of-sight around a normal and an ambient map.

Specific implementation of S203, S204, S205 and S206 may refer to the above embodiments, which will not be repeated here. The embodiment does not limit the execution order of S203, S204, S205 and S206.

S207: output a processed scene image according to the diffuse reflection processing, the highlight processing, the ambient light irradiation processing and the ambient reflected light processing performed on the scene image.

In an embodiment, color values of the scene image after the diffuse reflection processing, the highlight processing, the ambient light irradiation processing and the ambient reflected light processing are respectively performed on the scene image can be weighted and summed to be taken as the final output scene image.

The image processing method provided by the embodiment, based on the metallicity coefficient and the roughness coefficient, performs diffuse reflection processing, highlight processing, ambient light irradiation processing and ambient reflected light processing on the scene image, respectively, and fully considers material and surface roughness when rendering the scene image, which not only improves the authenticity of the scene to be displayed, makes the scene to be displayed more realistic and natural, but also has less computation in the whole processing process and low requirements for hardware processing performance of the device, so that it can run smoothly even in mobile terminals with limited hardware performance, thereby greatly improving the user experience.

Figure 3:
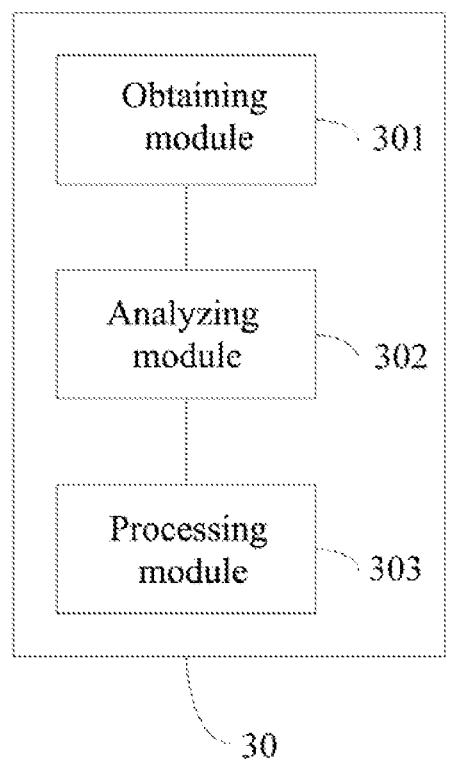
FIG. 3 is a schematic structural diagram of an embodiment of an image processing apparatus provided by the present disclosure.

An embodiment of the present disclosure provides an image processing apparatus. FIG. 3 is a schematic structural diagram of an embodiment of an image processing apparatus provided by the present disclosure. As shown in FIG. 3, the image processing apparatus 30 provided in the embodiment may include:

an obtaining module 301, configured to obtain a scene image in a scene to be displayed;

an analyzing module 302, configured to obtain a three-channel color value and a metallicity coefficient of each pixel point in the scene image; and a processing module 303, configured to perform diffuse reflection processing on the scene image according to the three-channel color value and the metallicity coefficient of each pixel point.

The apparatus of the embodiment can be configured to implement the technical solution of the method embodiment shown in FIG. 1, and their implementation principles and technical effects are similar, and will not be repeated here.

Figure 4:
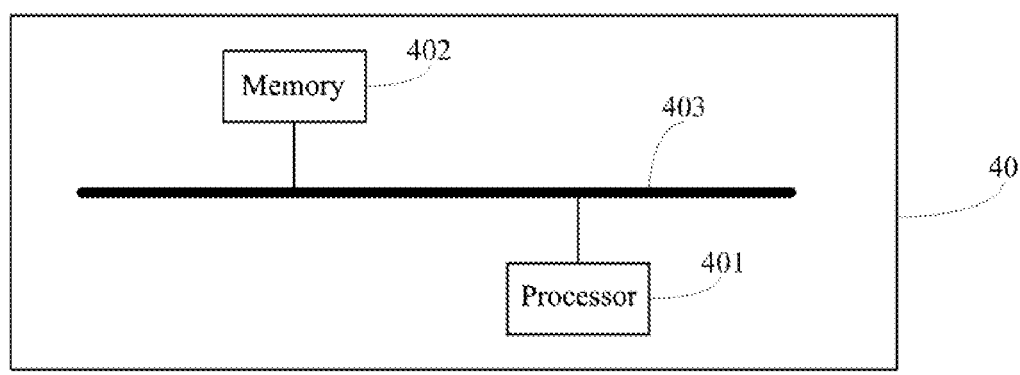
FIG. 4 is a schematic structural diagram of an embodiment of an electronic device provided by the present disclosure.

An embodiment of the present disclosure further provides an electronic device. FIG. 4 is a schematic structural diagram of an embodiment of an electronic device provided by the present disclosure. As shown in FIG. 4, the electronic device 40 provided in the embodiment may include:

at least one processor 401 and a memory 402;

where the memory 402 stores computer-executable instructions; and at least one processor 401 executes the computer-executable instructions stored in the memory 402 to cause the at least one processor 401 to execute the image processing method described above.

The at least one processor 401 and the memory 402 are connected through a bus 403.

The electronic device provided in the embodiment includes but is not limited to a smart phone, a computes, a game machine, a tablet device, a personal digital assistant, etc. Since the image processing method provided by the embodiments of the present disclosure has low computational cost, it can run smoothly even in mobile terminal devices with limited hardware performance, achieve a more real and realistic rendering effect, and improve the user experience.

The embodiment of the present disclosure further provides a computer-readable storage medium stored with computer-executable instructions, where the computer-executable instructions, when executed by a processor, is used to implement the image processing method described above.

In the above embodiments, it should be understood that the disclosed device and method may be implemented in other ways. For example, the device embodiments described above are merely illustrative. For example, the division of the modules is only a logical function division, and there may be other divisions in actual implementation, for example, multiple modules may be combined or integrated to another system, or some features may be ignored or not implemented. In addition, the mutual coupling or direct coupling or communication connection shown or discussed may be indirect coupling or communication connection through some interfaces, apparatuses or modules, and may be in electrical, mechanical or other forms.

The modules described as separate components may or may not be physically separated, and the components displayed as modules may or may not be physical units, that is, they may be located in one place, or they may be distributed to multiple network units. Some or all of the modules may be selected according to actual needs to achieve the purpose of the solutions of the embodiments.

In addition, various functional modules in the various embodiments of the present disclosure may be integrated into one processing unit, or various modules may exist alone physically, or two or more modules may be integrated into one unit. The units formed by the above modules may be realized in the form of hardware, or in the form of hardware plus software functional units.

The above integrated modules implemented in the form of software functional modules may be stored in a computer-readable storage medium. The above software functional module is stored in a storage medium and includes several instructions to cause a computer device (which may be a personal computer, a server, or a network device, etc.) or a processor to execute part of the steps of the method described in the embodiments of the present application.

It should be understood that the above processor may be a central processing unit (CPU), or other general-purpose processors, digital signal processors (DSPs), and application specific integrated circuits (ASICs), etc. The general-purpose processor may be a micro-processor or the processor may also be any conventional processor, etc. The steps of the method disclosed in combination with the present disclosure may be directly embodied as being executed by a hardware processor, or executed by a combination of hardware and software modules in the processor.

The memory may include a high-speed random access memory (RAM) memory, and may also include a non-volatile memory NVM, such as at least one disk memory, and may also be a U disk, a mobile hard disk, a read-only memory, a magnetic disk, or an optical disk.

The bus may be an industry standard architecture (ISA) bus, a peripheral component interconnection (PCI) bus, or an extended industry standard architecture (EISA) bus, etc. The bus may be divided into address bus, data bus, control bus, etc. For convenience of representation, the bus in the drawings of the present application is not limited to only one bus or one type of bus.

The above storage medium may be realized by any type of volatile or non-volatile storage device or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk. The storage medium may be any available medium that can be accessed by a general-purpose or special-purpose computer.

An exemplary storage medium is coupled to the processor, so that the processor can read information from the storage medium and can write information to the storage medium. Of course, the storage medium may also be a constituent part of the processor. The processor and the storage medium may be located in an application specific integrated circuit (ASIC). Of course, the processor and the storage medium may also exist as discrete components in the terminal or server.

Persons of ordinary skill in the art may understand that all or part of the steps in the above method embodiments may be implemented by hardware related to program instructions. The aforementioned program can be stored in a computer-readable storage medium. When the program is executed, the steps including the above method embodiments are executed. The aforementioned storage medium includes various storage medium which can store program codes, such as ROM, RAM, magnetic disk or optical disk.

Finally, it should be noted that the above embodiments are only used to illustrate the technical solutions of the present disclosure, but not limit thereto; although the present disclosure has been described in detail with reference to the foregoing embodiments, persons of ordinary skill in the art should understand that: he/she can still modify the technical solutions recited in the foregoing embodiments, or equivalently replace some or all of the technical features; however, these modifications or replacements do not make the essence of the corresponding technical solutions deviate from the scope of the technical solutions of the embodiments of the present disclosure.

What is claimed is:

1. An image processing method, comprising:
   obtaining a scene image in a scene to be displayed;
   obtaining a three-channel color value and a metallicity coefficient of each pixel point in the scene image;
   performing diffuse reflection processing on the scene image according to the three-channel color value and the metallicity coefficient of each pixel point;
   obtaining a three-channel color value of incident light in the scene to be displayed and a roughness coefficient of each pixel point in the scene image; and
   performing highlight processing on the scene image after the diffuse reflection processing according to the three-channel color value of the incident light together with the metallicity coefficient and the roughness coefficient of each pixel point to obtain a color value of each pixel point after the highlight processing;
   wherein the performing highlight processing on the scene image after the diffuse reflection processing according to the three-channel color value of the incident light together with the metallicity coefficient and the roughness coefficient of each pixel point, comprises:
   obtaining a micro-surface orientation distribution of each pixel point according to the roughness coefficient of each pixel point together with a normal direction, an incident light direction and a line-of-sight direction of the scene to be displayed;
   obtaining a Fresnel reflection value of each pixel point according to the metallicity coefficient of each pixel point together with the normal direction and the line-of-sight direction of the scene to be displayed;
   obtaining a shielding value of each pixel point according to the roughness coefficient of each pixel point together with the normal direction, the incident light direction and the line-of-sight direction of the scene to be displayed; and
   performing highlight processing on each pixel point according to the three-channel color value of the incident light together with the micro-surface orientation distribution, the Fresnel reflection value and the shielding value of each pixel point;
   wherein the obtaining a micro-surface orientation distribution of each pixel point according to the roughness coefficient of each pixel point together with a normal direction, an incident light direction and a line-of-sight direction of the scene to be displayed, comprises: for each pixel point, obtaining the micro-surface distribution of the pixel point according to the following formula:

$$D = R^4 / \{[(N \cdot H)^{2*}(R^4-1)+1]^{2*}\pi\}$$

the obtaining a Fresnel reflection value of each pixel point according to the metallicity coefficient of each pixel point together with the normal direction and the line-of-sight direction of the scene to be displayed, comprises: for each pixel point, obtaining the Fresnel reflection value of the pixel point according to the following formula:

$$F = M + (1-M) * 2^{[-5.5*(N \cdot V) - 6.9]*(N \cdot V)}; \text{ and}$$

the obtaining a shielding value of each pixel point according to the roughness coefficient of each pixel point together with the normal direction, the incident light direction and the line-of-sight direction of the scene to be displayed, comprises: for each pixel point, obtaining the shielding value of the pixel point according to the following formula:

$$G = 0.5 / \max(g_v + g_l, 10^{-6})$$

$$g_v = (N \cdot L) * \sqrt[2]{(R^4 + (1 - R^4) * (N \cdot V)^2)}$$

$$g_l = (N \cdot V) * \sqrt[2]{(R^4 + (1 - R^4) * (N \cdot L)^2)}$$

wherein D represents the micro-surface orientation distribution of the pixel point, F represents the Fresnel reflection value of the pixel point, G represents the shielding value of the pixel point, N represents a normal direction vector of the scene to be displayed, L represents an incident light direction vector of the scene to be displayed, V represents a line-of-sight direction vector of the scene to be displayed, M represents the metallicity coefficient of the pixel point, 0≤M≤1, R represents the roughness coefficient of the pixel point, 0≤R≤1, $g_v$ represents a shielding value of reflected light, $g_l$ represents a shielding value of the incident light, H represents a half-angle vector, H=(L+V)/2.

2. The method according to claim 1, further comprising:
obtaining a three-channel color value of ambient light in the scene to be displayed; and
performing ambient light irradiation processing on the scene image after the diffuse reflection processing according to the three-channel color value of the ambient light.

3. The method according to claim 2, further comprising:
obtaining a reflection direction of line-of-sight of the scene to be displayed around a normal of the scene to be displayed; and
performing ambient reflected light processing on the scene image after the diffuse reflection processing according to the reflection direction and an ambient map.

4. The method according to claim 1, the performing diffuse reflection processing on the scene image according to the three-channel color value and the metallicity coefficient of each pixel point, comprises:
performing diffuse reflection processing on each pixel point according to the three-channel color value and the metallicity coefficient of each pixel point together with a normal direction and an incident light direction of the scene to be displayed.

5. The method according to claim 4, the performing diffuse reflection processing on each pixel point according to the three-channel color value and the metallicity coefficient of each pixel point together with a normal direction and an incident light direction of the scene to be displayed, comprises:
for each pixel point, performing diffuse reflection processing on the pixel point according to the following formula:

$$I_{diff}=(N \cdot L)*(1.0-M)*T_{RGB}$$

wherein N represents a normal direction vector of the scene to be displayed, L represents an incident light direction vector of the scene to be displayed, N·L represents an inner product of N and L, M represents the metallicity coefficient of the pixel point, 0≤M≤1, $T_{RGB}$ represents the three-channel color value of the pixel point, $I_{diff}$ represents a three-channel color value of the pixel point after the diffuse reflection processing.

6. The method according to claim 1, the performing highlight processing on each pixel point according to the three-channel color value of the incident light together with the micro-surface orientation distribution, the Fresnel reflection value and the shielding value of each pixel point, comprises:
for each pixel point, performing highlight processing on the pixel point according to the following formula:

$$I_{spec}=\{D*F*G/[4(N \cdot L)(N \cdot V)]\}*T_L$$

wherein D represents the micro-surface orientation distribution of the pixel point, F represents the Fresnel reflection value of the pixel point, G represents the shielding value of the pixel point, N represents a normal direction vector of the scene to be displayed, L represents an incident light direction vector of the scene to be displayed, V represents a line-of-sight direction vector of the scene to be displayed, N·L represents an inner product of N and L, N·V represents an inner product of N and V, $T_L$ represents a three-channel color value of the incident light, $I_{spec}$ represents a color value of the pixel after the highlight processing.

7. The method according to claim 2, the performing ambient light irradiation processing on the scene image after the diffuse reflection processing according to the three-channel color value of the ambient light, comprises:
for each pixel point, performing ambient light irradiation processing on the pixel point according to the following formula:

$$I_{amb}=C_{amb} \cdot *I_{diff}/\pi$$

wherein $C_{amb}$ represents the three-channel color value of the ambient light, $I_{diff}$ represents a three-channel color value of the pixel point after the diffuse reflection processing, $I_{amb}$ represents a three-channel color value of the pixel point after the ambient light irradiation processing.

8. A non-transitory computer-readable storage medium stored with computer-executable instructions, wherein the computer-executable instructions, when executed by a processor, is used to implement the image processing method according to claim 1.

9. An electronic device, comprising: at least one processor and a memory;
wherein computer-executable instructions are stored on the memory and operable on the at least one processor, and the at least one processor, when running the computer-executable instructions, is configured to:
obtain a scene image in a scene to be displayed;
obtain a three-channel color value and a metallicity coefficient of each pixel point in the scene image;
perform diffuse reflection processing on the scene image according to the three-channel color value and the metallicity coefficient of each pixel point;
obtain a three-channel color value of incident light in the scene to be displayed and a roughness coefficient of each pixel point in the scene image; and
perform highlight processing on the scene image after the diffuse reflection processing according to the three-channel color value of the incident light together with the metallicity coefficient and the roughness coefficient of each pixel point to obtain a color value of each pixel point after the highlight processing to obtain a color value of each pixel point after the highlight processing;
wherein the at least one processor is further configured to:
obtain a micro-surface orientation distribution of each pixel point according to the roughness coefficient of each pixel point together with a normal direction, an incident light direction and a line-of-sight direction of the scene to be displayed;
obtain a Fresnel reflection value of each pixel point according to the metallicity coefficient of each pixel point together with the normal direction and the line-of-sight direction of the scene to be displayed;
obtain a shielding value of each pixel point according to the roughness coefficient of each pixel point together with the normal direction, the incident light direction and the line-of-sight direction of the scene to be displayed; and
perform highlight processing on each pixel point according to the three-channel color value of the incident light together with the micro-surface orientation distribution, the Fresnel reflection value and the shielding value of each pixel point;

wherein the at least one processor is further configured to:
for each pixel point, obtain the micro-surface distribution of the pixel point according to the following formula:

$$D=R^4/\{[(N\cdot H)^2*(R^4-1)+1]^2*\pi\}$$

the obtaining a Fresnel reflection value of each pixel point according to the metallicity coefficient of each pixel point together with the normal direction and the line-of-sight direction of the scene to be displayed, comprises: for each pixel point, obtaining the Fresnel reflection value of the pixel point according to the following formula:

$$F=M+(1-M)*2^{[-5.5*(N\cdot V)-6.9]*(N\cdot V)}; \text{ and}$$

the obtaining a shielding value of each pixel point according to the roughness coefficient of each pixel point together with the normal direction, the incident light direction and the line-of-sight direction of the scene to be displayed, comprises: for each pixel point, obtaining the shielding value of the pixel point according to the following formula:

$$G = 0.5/\max(g_v + g_l, 10^{-6})$$
$$g_v = (N\cdot L)*\sqrt[2]{(R^4 + (1-R^4)*(N\cdot V)^2)}$$
$$g_l = (N\cdot V)*\sqrt[2]{(R^4 + (1-R^4)*(N\cdot L)^2)}$$

wherein D represents the micro-surface orientation distribution of the pixel point, F represents the Fresnel reflection value of the pixel point, G represents the shielding value of the pixel point, N represents a normal direction vector of the scene to be displayed, L represents an incident light direction vector of the scene to be displayed, V represents a line-of-sight direction vector of the scene to be displayed, M represents the metallicity coefficient of the pixel point, 0≤M≤1, R represents the roughness coefficient of the pixel point, 0≤R≤1, $g_v$ represents a shielding value of reflected light, $g_l$ represents a shielding value of the incident light, H represents a half-angle vector, H=(L+V)/2.

10. The electronic device according to claim 9, wherein the at least one processor is further configured to:
obtain a three-channel color value of ambient light in the scene to be displayed; and
perform ambient light irradiation processing on the scene image after the diffuse reflection processing according to the three-channel color value of the ambient light.

11. The electronic device according to claim 10, wherein the at least one processor is further configured to:
obtain a reflection direction of line-of-sight of the scene to be displayed around a normal of the scene to be displayed; and
perform ambient reflected light processing on the scene image after the diffuse reflection processing according to the reflection direction and an ambient map.

12. The electronic device according to claim 9, wherein the at least one processor is further configured to:
perform diffuse reflection processing on each pixel point according to the three-channel color value and the metallicity coefficient of each pixel point together with a normal direction and an incident light direction of the scene to be displayed.

13. The electronic device according to claim 12, wherein the at least one processor is further configured to:
for each pixel point, perform diffuse reflection processing on the pixel point according to the following formula:

$$I_{diff}=(N\cdot L)*(1.0-M)*T_{RGB}$$

wherein N represents a normal direction vector of the scene to be displayed, L represents an incident light direction vector of the scene to be displayed, N·L represents an inner product of N and L, M represents the metallicity coefficient of the pixel point, 0≤M≤1, $T_{RGB}$ represents the three-channel color value of the pixel point, $I_{diff}$ represents a three-channel color value of the pixel point after the diffuse reflection processing.

14. The electronic device according to claim 9, wherein the at least one processor is further configured to:
for each pixel point, perform highlight processing on the pixel point according to the following formula:

$$I_{spec}=\{D*F*G/[4(N\cdot L)(N\cdot V)]\}*T_L$$

wherein D represents the micro-surface orientation distribution of the pixel point, F represents the Fresnel reflection value of the pixel point, G represents the shielding value of the pixel point, N represents a normal direction vector of the scene to be displayed, L represents an incident light direction vector of the scene to be displayed, V represents a line-of-sight direction vector of the scene to be displayed, N·L represents an inner product of N and L, N·V represents an inner product of N and V, $T_L$ represents a three-channel color value of the incident light, $I_{spec}$ represents a color value of the pixel after the highlight processing.

* * * * *

UNITED STATES PATENT AND TRADEMARK OFFICE
CERTIFICATE OF CORRECTION

| | | |
|---|---|---|
| PATENT NO. | : 11,436,794 B2 | Page 1 of 1 |
| APPLICATION NO. | : 17/217824 | |
| DATED | : September 6, 2022 | |
| INVENTOR(S) | : Xiangjun Liu | |

It is certified that error appears in the above-identified patent and that said Letters Patent is hereby corrected as shown below:

On the Title Page

Item (73) should read as follows:
(73) Assignee: BEIJING JINGDONG SHANGKE INFORMATION TECHNOLOGY CO., LTD., Beijing (CN)
BEIJING JINGDONG CENTURY TRADING CO., LTD., Beijing (CN)

Signed and Sealed this
Twenty-fifth Day of November, 2025

John A. Squires
*Director of the United States Patent and Trademark Office*